April 23, 1957   F. LJUNGSTRÖM   2,789,805
DEVICE FOR RECOVERING FUEL FROM SUBTERRANEOUS FUEL-CARRYING
DEPOSITS BY HEATING IN THEIR NATURAL LOCATION USING A
CHAIN HEAT TRANSFER MEMBER
Filed May 26, 1953
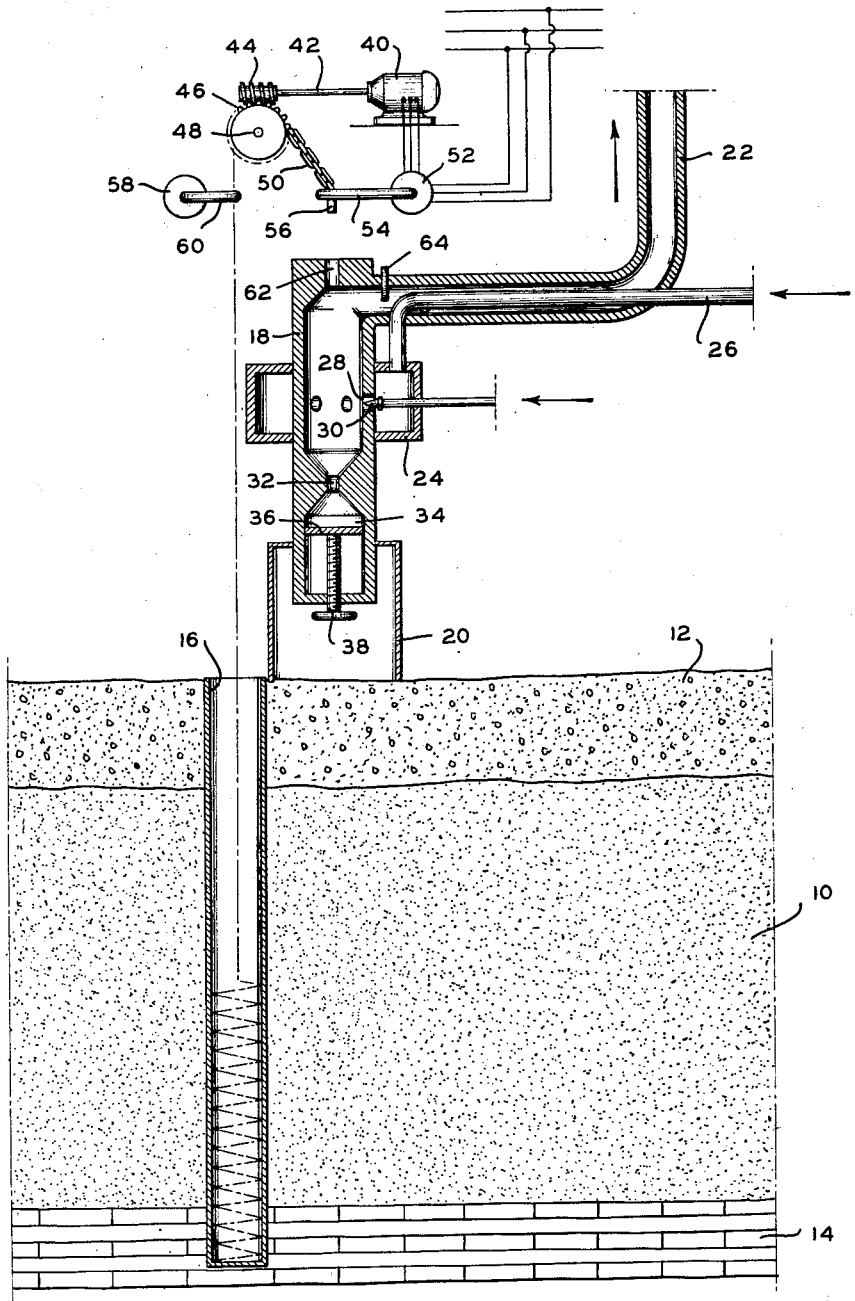
INVENTOR
Fredrik Ljungström
BY Sol Shapurio
ATTORNEY

United States Patent Office 2,789,805
Patented Apr. 23, 1957

2,789,805

DEVICE FOR RECOVERING FUEL FROM SUBTERRANEOUS FUEL-CARRYING DEPOSITS BY HEATING IN THEIR NATURAL LOCATION USING A CHAIN HEAT TRANSFER MEMBER

Fredrik Ljungström, Fiskebäckskil, Sweden, assignor to Svenska Skifferolje Aktiebolaget, Orebro, Sweden, a Swedish joint-stock company Application May 26, 1953, Serial No. 357,458

Claims priority, application Sweden May 27, 1952

9 Claims. (Cl. 262—3)

This invention relates to a device for recovering fuel from subterraneous fuel-carrying geological formations or deposits by heating in their natural location and by means of holes or wells driven thereinto. Examples for fuel-carrying formations of the kind in question are shale and the so-called oil or tar sand to be found in large quantities in i. a. Canada. I have developed a method according to which heating members fed with electric current for heating the fuel-carrying deposit are introduced into the holes or wells. The fuel is converted into such condition to permit its collecting through holes or channels provided besides the heat-supplying holes in the fuel-carrying formations. The heating may be performed so as to cause a gasifying by pyrolysis of the fuel which then in gaseous state is carried to the collecting holes, the gases being cooled down and their condensable constituents such as gasoline, precipitated in fluid state. This method is generally disclosed in my co-pending applications Serial No. 756,624, filed June 24, 1947, now Patent No. 2,732,195, Serial No. 756,627, filed June 24, 1947, now abandoned, Serial No. 210,682, filed February 13, 1951, now abandoned, and Serial No. 288,946, filed May 20, 1952. One object of my invention is to provide a simple and reliable device to be used advantageously in preliminary research of fuel-carrying formations, but besides also in commercial recovery of oil from such formations if situated in remote districts to which electric power lines are expensive to extend. Another similar situation is the case when the electric power available is insufficient or too expensive.

A further object of my invention is to provide a device adapted to be transported to the recovery place in assembled condition and thus not requiring there any complicated and delicate assembly work.

Further objects and advantages of my invention will be apparent from the following description considered in connection with the accompanying drawing which forms part of this specification and which presents a somewhat diagrammatic and partially vertically sectioned embodiment of my invention.

Referring to the drawing, 10 designates a fuel-carrying formation such as for example oil sand, which may be covered by a layer 12 of gravel or earth or other species of stone. The sand layer 10 rests in the illustrated case on a layer 14 which may be not at all or only slightly fuel-carrying and exist in the shape of a shale formation, i. e. consist of horizontally co-hering thin layers of lime stone, for example. Through the geological formations penetrate holes or wells of which one is illustrated in the drawing. The holes or wells have their walls covered with tubes 16 made of metal.

A furnace or fire place 18 supported by a stand 20 has an exhaust duct 22 for the gases of combustion. The furnace is surrounded by a casing 24 into which fresh air is introduced through a conduit 26. Said conduit is inserted into the exhaust duct 22 so as to cause preheating of the fresh air. The furnace which is elongated in the vertical direction, has about its circumference openings 28 communicating with the casing 24 and adapted to house burner nozzles 30 for fuel oil or gas. The furnace 18 tapers downward conically towards a passage 32 below which is a non-heated room 34. The volume accessible through the passage 32 of this room is adjustable by means of a disc 36 and a screw 38.

An electric motor 40 has a shaft 42 carrying for example a worm wheel 44 engaging a toothed wheel 46 carried by a shaft 48. Said shaft carries a further wheel provided with V-shaped grooves, or a sprocket wheel, about which passes an elongated collapsible member constructed according to the invention, such as a chain 50. The motor 40 which is reversible, is equipped with a circuit breaker and phase shifter 52. From this latter projects a fork 54 between the pins of which the chain is capable of passing undisturbed but which is forced to reverse when a stop member 56 secured to the chain abuts against the pins of said fork. A similar circuit breaker and phase shifter 58 equipped with an actuating arm 60 may be provided to co-operate with the part of the chain located on the opposite of the wheel 46.

In the position illustrated in the drawing the stop member 56 secured to the one end of the chain 50 has just abutted against the arm 54. The motor 40 is reversed to as to cause the chain to be carried through an opening 62 in the roof or the furnace into the interior thereof. Under this movement the chain initially will pass straightly through the furnace and through the passage 32 down into the room 34. The part of the chain collected in said room will not be heated to any appreciable degree. The part of the chain remaining in the furnace however, will be heated to a temperature of up to 800° C., for example. The motor 40 is stopped automatically, for example by a stop member secured to the opposite end of the chain abutting against the arm 60. On reaching the desired temperature the motor 40 is started a new but for rotation in the opposite direction. This is preferably effected automatically, for example by means of a time relay or a thermostat 64 influenced by the temperature of the combustion gases escaping from the furnace. This temperature rises in response to the increase in the temperature of the part of the chain under heating in the furnace. The chain is now inserted into the hole or well 16, the cross sectional area of which it fills more or less depending on which portion of the geological formations are to be heated at a given moment. The chain having given off its heat, the cycle described above is automatically repeated. The longish member 50 will thus alternatingly take up heat in the furnace 16 and give off the collected heat to the fuel-carrying deposit.

By varying the accessible volume of the room 34 the non-heated portion of the chain may be given a more extended or limited length. As is evident from my co-pending application No. 288,946, filed May 20, 1952, it may be advantageous to commence the heating process in that part of the hole or well, which enters or is adjacent the underlying layer 14. In this case the entire or major portion of the accessible volume of the room 43 is utilized so as to leave a correspondingly large portion of the chain unheated. If later on a portion of the fuel-carrying deposit located at a higher level is to be heated, the accessible volume of the room 34 is reduced. A stop member actuating the arm 60 may be placed on the chain so as to prevent the chain to pass with its entire length through the opening 62 into the furnace. The intensity of the heating may also be varied by keeping the chain straight in certain parts of the tube 16 while permitting it in parts at a lower level to fill the whole tube section. The total length of the chain may be dimensioned so as in the situation illustrated in the figure to fill the whole tube 16.

While one more or less specific embodiment of the invention has been described, it is to be understood that this is for purpose of illustration only, and that the invention is not to be limited thereby, but its scope is to be determined from the appended claims.

What I claim is:

1. A device for recovering fuel from subterraneous fuel-carrying deposits by heating in their natural location in situ by means of holes driven thereinto, comprising a furnace, a double-ended elongated collapsible chain member, driving means to feed the collapsible member through said furnace and thereupon into the hole with one end leading in order to transfer heat from the furnace to the deposit.

2. A device as claimed in claim 1, in which the elongated member is reciprocated by said driving means between the furnace and the hole.

3. A device as claimed in claim 2 in which the driving means comprises a reversible motor including stop means, actuated by the elongated member in response to its position relative to the driving means.

4. A device as claimed in claim 1, in which the furnace is provided with an opening through which the elongated member is fed into the furnace, and a further opening communicating with a room spaced from said furnace and from said deposit which is adapted to take up portions of the elongated member separated from other portions which serve in the transfer of heat to the well.

5. A device as claimed in claim 4, in which the accessible volume of said room is variable to control the length of member stored therein.

6. A device as claimed in claim 1, in which the elongated member has a length which is greater than the distance between the furnace and the bottom of the well.

7. A method for recovering valuable products from subterraneous fuel-carrying geological formations by heating the formation in situ by heat supplied in holes in said formations, which comprises passing a double-ended elongated collapsible heating chain alternately through a heating zone to heat it to an elevated temperature and through a hole in the formation with one end leading to heat the formation to gasify fuel therein.

8. The method of claim 7 in which fuel in the formation is heated to a temperature to pyrolyze said fuel.

9. The method of claim 7 in which the elongated member is heated at a controlled portion only thereof to determine the portion of the formation which is heated.

References Cited in the file of this patent

UNITED STATES PATENTS

| | | |
|---|---|---|
| 118,384 | Newberry | Aug. 22, 1871 |
| 2,472,445 | Sprong | June 7, 1949 |
| 2,634,961 | Ljungstrom | Apr. 14, 1953 |

FOREIGN PATENTS

| | | |
|---|---|---|
| 89,244 | Austria | Aug. 25, 1922 |
| 374,792 | Italy | Sept. 9, 1939 |